United States Patent

[11] 3,610,690

[72] Inventor William F. Mengel
 521 Elm St., Wisconsin Rapids, Wis. 54494
[21] Appl. No. 821,620
[22] Filed May 5, 1969
[45] Patented Oct. 5, 1971

[54] SUPPORT ARRANGEMENT FOR TRUCK BODY
 9 Claims, 4 Drawing Figs.
[52] U.S. Cl. .................................................. 298/17.5,
 298/22 R
[51] Int. Cl. .................................................. B60p 1/16
[50] Field of Search .......................................... 298/22, 19,
 21, 17.5, 10, 17.6, 17 S

[56] References Cited
UNITED STATES PATENTS
2,190,869 2/1940 Frentzel ........................ 298/22 X
2,623,602 12/1952 Double .......................... 298/22 X
3,231,309 1/1966 Talbert .......................... 298/17.5

FOREIGN PATENTS
1,365,783 5/1964 France ......................... 298/22
426,508 6/1967 Switzerland ................. 298/22 F Primary Examiner—Richard J. Johnson
Attorneys—John W. Michael, Gerrit D. Foster, Bayard H. Michael, Paul R. Puerner, Joseph A. Gemignani, Andrew O. Riteris and Spencer B. Michael ABSTRACT: A load carriage is connected to an auxiliary frame for pivotal movement relative thereto about a first axis. The auxiliary frame is connected to the chassis of a vehicle for pivotal movement about a second axis and relative to the chassis. The load carriage engages the chassis for normal transportation and is rotatable by a telescoping ram about said first axis into engagement with the auxiliary frame for joint rotation with the auxiliary frame about said second axis. Movement about the second axis selectively positions the load carriage for unloading or transportation.

PATENTED OCT 5 1971
3,610,690
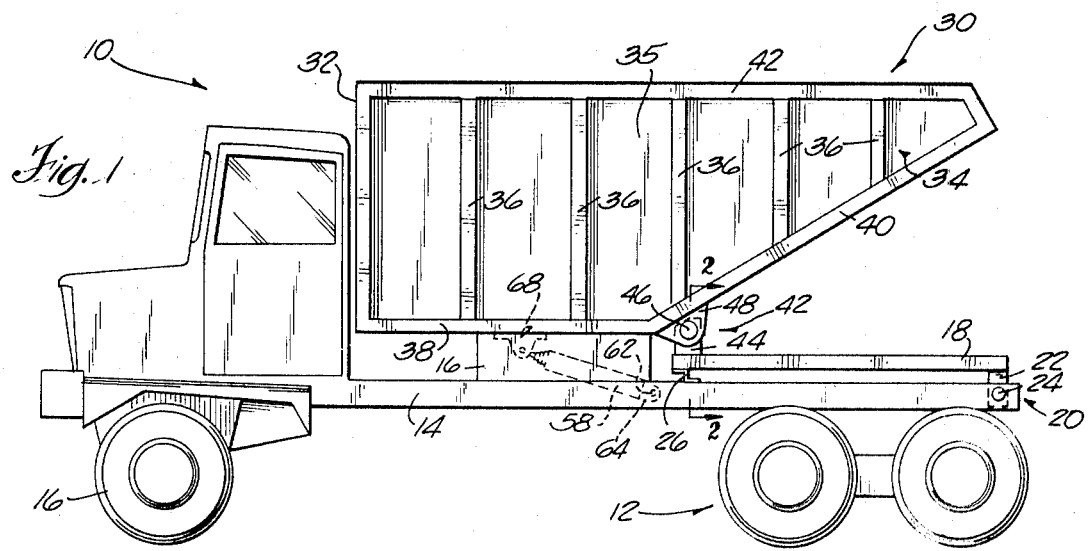
Fig.1
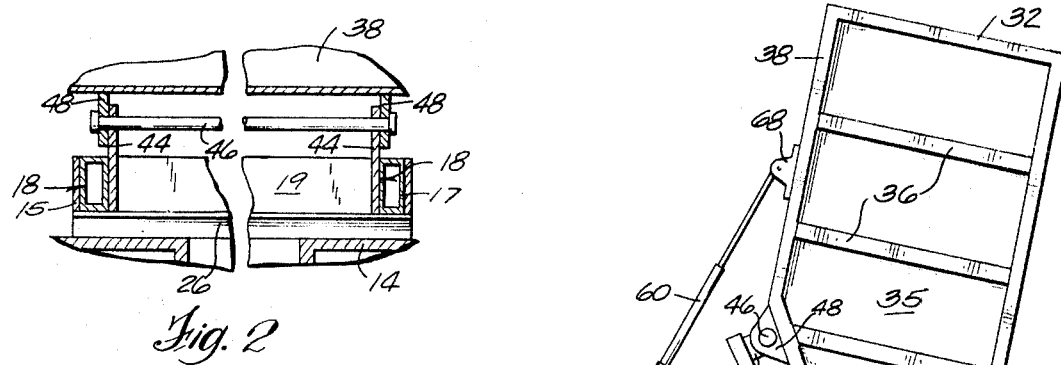
Fig. 2
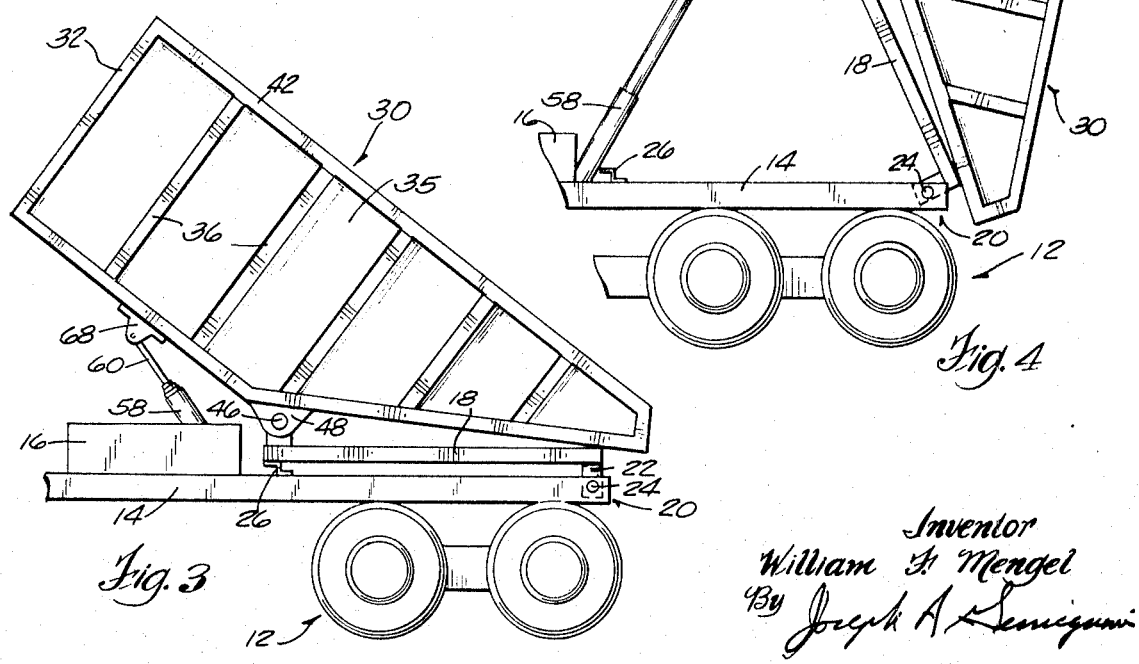
Fig.3
Fig.4
Inventor
William F. Mengel
By Joseph A. Geniesse
Attorney

SUPPORT ARRANGEMENT FOR TRUCK BODY

BACKGROUND OF INVENTION

1. Field of the Invention

This invention relates to improvements in dump-type trucks for hauling loads such as sand, gravel, dirt or the like and, more particularly, to the connection of the load carriage of such trucks to the chassis.

2. Description of the Prior Art

In a conventional dump truck used for hauling sand, gravel and dirt, the load carriage or dump box is generally open and rectangular in shape. For transportation the load carriage normally rests on the truck chassis in a horizontal position with the center of mass generally around the rear axle. For unloading, the load carriage is pivotally raised to discharge the load through the rear of the load carriage. Several factors limit the size of load which can be handled. One is load stability which is a function of the location of the center of mass of the load with respect to the wheels. A second problem is that if an extremely long load carriage is utilized, extra stress may be placed on the lifting means as the result of a larger moment arm. A third problem is the legal limit on maximum axle loads.

SUMMARY OF INVENTION

A principal object of this invention is to materially simplify the construction of the equipment, reduce the cost thereof, and yet provide for the transportation of unusually heavy load in stabilized positions within maximum legal limits.

For achievement of these and other objects this invention proposes a dual-pivot support arrangement for a load carriage on the frame of a truck or the like. The load carriage is connected to an auxiliary frame for pivotal movement about a first axis relative to and into and out of engagement with the auxiliary frame. The auxiliary frame is connected to the truck chassis or fixed frame for pivotal movement relative to the fixed frame about a second axis spaced from the first axis. With this arrangement a load carriage is provided with spaced sides and ends, and a bottom wall having first and second angularly related portions. During normal transport position, the first bottom wall portion of the load carriage rests on the fixed frame in a horizontal position. The load carriage is connected to the auxiliary frame about said first axis near the juncture of the two bottom wall portions and for unloading of the load carriage it is rotated about said first axis until the second bottom wall portion rests on said auxiliary frame. Continued rotation of the load carriage will then pivot the load carriage and auxiliary frame jointly about said second axis towards a vertical unload position, the load being dumped by its own gravitational weight.

As a result of the above arrangement a single hydraulic ram is sufficient to provide the required rotational force. The ram is pivotally connected at one end to the fixed frame and pivotally connected at the other end to said first bottom wall portion.

BRIEF DESCRIPTION OF THE DRAWINGS

FIG. 1 is a side elevational view of a conventional truck with the load carriage in a transport position;

FIG. 2 is a sectional view taken generally along line 2—2 of FIG. 1;

FIG. 3 is a side elevational view of the load carriage just prior to unloading; and FIG. 4 is a side elevational view of the load carriage in an unloading position with the ram cylinder fully extended.

DESCRIPTION OF THE PREFERRED EMBODIMENT

Referring now to the drawings in detail, FIG. 1 shows a truck 10 having a tandem rear wheel and axle system 12 and a front wheel and axle system 16. It will be appreciated that any conventional vehicle may incorporate the proposed invention; hence, a detailed description of truck 10 is omitted.

An auxiliary subframe assembly 18 includes a pair of oppositely spaced structural members 15 and 17 connected together through suitable cross braces 19 (one illustrated in FIG. 2) spaced at intervals along the lengths of the structural members and at each end. Auxiliary subframe 18 is pivotally connected to the chassis frame 14 by means of a pivot assembly 20 supported at the rear end of the chassis frame and auxiliary frame. This is accomplished by conventional means such as a pair of brackets 22, one located at each side of the auxiliary frame and extending normal to the auxiliary frame. The brackets have openings for receipt of a metal rod 24 which is secured to chassis frame 14. Rod 24 defines an axis for pivotal movement of the auxiliary frame with respect to the chassis frame. As illustrated, when in its transportation position the auxiliary frame is supported by the chassis through support rest 26.

As shown in FIG. 1, load carriage 30 is comprised of a front end 32 and two spaced sides 34. Only one side 34 is visible in the drawing but both include a plate 35 and structural support members 36 spaced at intervals along the length of plate 35. Carriage 30 also includes two bottom walls 38 and 40. Bottom wall 38 is generally parallel to the top edge 42 of the load carriage, i.e. the top edge of sides 34. Bottom wall 40 is disposed at an angle to both bottom wall 38 and top edges 42 of sides 34. Bottom wall 40 slopes from bottom wall 38 to the rear of the load carriage 30, in essence wall 40 acts as or cooperates in forming the rear of the load carriage.

As shown in the drawings, load carriage 30 is pivotally connected to auxiliary subframe 18 by second pivot assembly 42, which is separate and spaced from pivot means 20. Pivot means 42 includes brackets 48 extending from load carriage 30 at a position near the intersection of bottom wall 38 and bottom wall 40. Brackets 48 have openings for receiving an axle or rod 46 which is also engaged in openings in brackets 44 fixed to and extending from auxiliary frame 18. With this arrangement the load carriage is capable of rotation about the axis defined by pivot means 42.

It will be noted that the load carriage has a dual-pivot connection to the truck. More particularly, the load carriage is pivotable with respect to the auxiliary frame about pivot assembly 42 and the load carriage and auxiliary frame are pivotable jointly about pivot assembly 20 relative to the chassis frame. With the dual-pivot arrangement the configuration of the load carriage can be selected for optimum load distribution. More particularly, the significance of the illustrated configuration of load carriage 30 is that when the load carriage is in its normal transport position, the center of mass of load carriage 30 will always be at some point over the bottom wall 38 and therefore well forward of the rear wheel and axle system 12. This arrangement more evenly the load between the front and rear axle systems.

It should further be noted that in the transport position as shown in FIG. 1, bottom wall 40 is spaced from auxiliary frame 18. For purposes of unloading, load carriage 30 is raised, causing it to pivot around pivot 42 until bottom wall 34 engages auxiliary subframe 18 as shown in FIG. 3. Further raising of the load carriage will now result in joint pivotal movement of the load carriage and the auxiliary frame about pivot 20 until the load carriage reaches its full unloading position (FIG. 4).

It will be appreciated that, depending upon the type of load (i.e. sand or gravel etc.) and depending upon the whether the load is to be distributed as vehicle 10 is moving or is to be deposited at one point, load carriage 30 can be vertically raised to any desired position allowing for a rapid unloading of the load carriage or gradual unloading as the vehicle is moved. In either event the load carriage 30 is entirely emptied by pivotally rotating the load carriage and auxiliary frame 18 about pivot assembly 20.

To rotate load carriage 30 and auxiliary frame 18 about pivot assemblies 20 and 42, this invention proposes the use of a conventional hydraulic cylinder 56 extending between chassis frame 14 and load carriage 30. Hydraulic cylinder 56 is comprised of a cylinder 58 and a telescoping ram 60, the cylinder being pivotally connected to chassis frame 14 at bracket 64. Ram 60 extends to a bracket assembly 68 projecting from bottom wall 38. The load carriage is thus simply and effectively raised through the use of a singly hydraulic cylinder.

The hydraulic system supplying fluid to the hydraulic cylinder is not illustrated as it is well understood in the art.

Cylinder 58 is pivotally connected to the chassis 14 below the front portion of auxiliary frame 18. In its fully retracted state (when the load carriage is in its normal transport position) hydraulic cylinder 56 lies in a generally horizontal position along chassis frame 14. In the transport position the load carriage is principally supported from the chassis frame. As illustrated, structural embers 16 are connected to the chassis frame and form the actual point of support for the load carriage. Members 16 actually space the load carriage above the main plane of the chassis frame to accommodate the hydraulic cylinder.

When the cylinder is activated, the ram 60 telescopes out of cylinder 58 and moves load carriage 30 out of engagement with members 16 and rotates it into engagement with auxiliary frame 18. From this point, a continued activation of hydraulic cylinder 56 will rotate load carriage 30 and auxiliary frame 18 towards the vertical emptying position.

Auxiliary frame 18 and load carriage 30 are maintained in their elevated position by hydraulic pressure in the hydraulic cylinder 56. Load carriage 30 will return to its normal transport position shown in FIG. 1 by either releasing the hydraulic pressure or by reversing the hydraulic pressure in cylinder 56. The load carriage will be held in its transport position by the weight of the load and/or load carriage 30. It will be noted in the position shown in FIG. 1, that the center of mass of the load carriage is well forward of the rear axle for ideal load distribution while the overhead clearance of the load carriage has been held at a minimum.

Thus, the structure of this invention allows the transportation of larger loads with load weight more evenly distributed over the axles. This is accomplished in an effective and economically feasible structure.

I claim:

1. The combination in a load-carrying vehicle comprising
a chassis frame,
an auxiliary frame,
a load carriage including spaced opposite ends connected by spaced opposed sides with a bottom wall extending between said sides and ends and having first and second angularly related portions,
first pivot means fixedly attached to said auxiliary frame rotatably connecting said load carriage to said auxiliary frame, said load carriage being arranged to be capable of rotation about a first axis provided by said first pivot means into and out of engagement with said auxiliary frame,
second pivot means arranged rearwardly of said first pivot axis with respect to said chassis frame and rotatably connecting said auxiliary frame to said chassis frame for pivotable movement of said auxiliary frame relative to said chassis frame about a second axis spaced from said first pivot axis,
and means for rotating said load carriage about said first axis into engagement with said auxiliary frame and further operative after said engagement to continue rotation of said load carriage jointly with said auxiliary frame about said second pivot axis.

2. A load-carrying vehicle comprising
a frame
front and rear axle systems connected to said chassis frame,
an auxiliary frame,
means pivotally connecting said auxiliary frame to said chassis frame adjacent the rear end thereof for pivotal movement about said pivot connection so that said auxiliary frame is pivotable into and out of a position resting on and overlying said chassis frame,
a load carriage,
means pivotally connecting said load carriage to said auxiliary frame at a position forward of said first-mentioned pivot means for movement about a pivot axis between a transport position wherein said load carriage engages said chassis frame and an intermediate position wherein said load carriage is moved from said transport position into engagement with said auxiliary frame,
said load carriage characterized in that it includes a bottom having first and second angularly related portions each of which moves into and out of engagement with a respective one of said chassis and auxiliary frames as said load carriage moves between said transport and intermediate positions,
and means connected to said load carriage for rotating said load carriage about said pivot axis between said transport and intermediate positions and further operative when said load carriage is in said intermediate position to rotate said load carriage and auxiliary frame jointly about said pivot connection relative to said chassis frame to a generally vertical unloading position of said load carriage.

3. The load-carrying vehicle according to claim 2 wherein said means for rotating said load carriage and auxiliary frame comprises
a telescoping ram pivotally connected at one end to said chassis frame and pivotally connected at its other end to said first bottom portion, said ram expanding and contracting to rotate said load carriage relative to said chassis and auxiliary frame, and further operable to rotate said load carriage and auxiliary frame jointly relative to said chassis frame.

4. The load-carrying vehicle according to claim 2 wherein said load carriage includes spaced opposite ends connected by spaced opposed sides wherein the longitudinal cross section of said carriage is generally uniform from the forwardmost end to a point near the juncture of said first and second bottom portions and said cross section diminishes to a minimum at the rearwardmost end of said load carriage such that the center of mass of said carriage is over said first bottom portion when said load carriage is in said transport position.

5. The load-carrying vehicle according to claim 4 wherein said uniform cross section of said load carriage if forward of said rear axle.

6. The combination in a load-carrying vehicle comprising
a chassis frame,
an auxiliary frame,
a load carriage including spaced opposite ends connected by spaced opposed sides and a bottom wall extending between said sides and having first and second angularly related portions,
said first bottom portion of said load carriage being removably engageable with said chassis frame for support thereby when in a normal horizontal transport position,
said second bottom portion of said load carriage being removably engageable with said auxiliary frame,
first pivot means connecting said load carriage to said auxiliary frame for limited pivotal movement of said load carriage about a first axis relative to and into and out of engagement with said auxiliary frame,
second pivot means rotatably connecting said auxiliary frame to said chassis frame for pivotable movement of said auxiliary frame relative to said chassis frame about a second pivot axis spaced from said first pivot axis,
means for rotating said load carriage about said first axis and raising said load carriage from said engagement with chassis frame to engage said second bottom portion with said auxiliary frame whereupon said continued raising of said load carriage results in joint movement of said load carriage and auxiliary frame about said second axis.

7. The combination of claim 6 wherein
the juncture of said angularly related portions is in the area of said first pivot axis,
said sidewalls each include a top edge, and wherein said first bottom portion extends forwardly of said first pivot axis and said second bottom portion is rearward of said first pivot axis and slopes toward said top edges and said load carriage has a substantial load-carrying volume forward of said first pivot axis.

8. The combination according to claim 7 wherein said vehicle includes a front and rear axle system supporting said chassis frame, and said first pivot axis is disposed between said front and rear axle systems and the center of mass of a load in said load carriage is generally in front of said rear axle system when said load carriage is in engagement with said chassis frame.

9. The combination according to claim 7 wherein said means for rotating said load carriage and said auxiliary frame comprises a telescoping ram pivotally connected at one end to said chassis frame and pivotally connected at its other end to said first bottom portion forwardly of said first pivot axis, said ram expanding and contracting to rotate said load carriage about said first pivot axis relative to said chassis and auxiliary frame and about said second pivot axis jointly with said auxiliary frame relative to said chassis frame.